United States Patent [19]
Weder

[11] Patent Number: 5,617,702
[45] Date of Patent: Apr. 8, 1997

[54] METHOD FOR SECURING A DECORATIVE COVER ABOUT A FLOWER POT

[75] Inventor: Donald E. Weder, Highland, Ill.

[73] Assignee: Southpac Trust International, Inc., Oklahoma City, Okla.

[21] Appl. No.: 539,034

[22] Filed: Oct. 4, 1995

Related U.S. Application Data

[63] Continuation of Ser. No. 165,154, Dec. 10, 1993, abandoned, which is a continuation of Ser. No. 979,389, Nov. 19, 1992, abandoned, which is a continuation of Ser. No. 832,096, Feb. 6, 1992, abandoned, which is a continuation-in-part of Ser. No. 765,416, Sep. 26, 1991, Pat. No. 5,105,599, which is a continuation of Ser. No. 530,491, May 29, 1990, abandoned, which is a continuation of Ser. No. 315,169, Feb. 24, 1989, abandoned.

[51] Int. Cl.$^6$ ............................ B65B 11/58; B65B 27/00
[52] U.S. Cl. ................................ 53/399; 53/397; 53/449; 53/464; 47/72
[58] Field of Search .................................... 53/138.1, 397, 53/399, 449, 464, 176, 221, 390, 580, 582, 583, 585, 592; 47/72; 100/2, 9, 212; 215/12.1; 229/45

[56] References Cited

U.S. PATENT DOCUMENTS

| Re. 27,744 | 8/1973 | Billett . |
|---|---|---|
| Re. 31,353 | 8/1983 | Cheung . |
| D. 295,525 | 5/1988 | Sakaki . |
| 2,133,278 | 10/1938 | Brogden . |
| 2,236,936 | 4/1941 | Camp . |
| 2,274,526 | 2/1942 | Bunn . |
| 2,367,168 | 1/1945 | Cheesman . |
| 2,514,038 | 7/1950 | Doolittle . |
| 2,882,660 | 4/1959 | Denton . |
| 2,924,926 | 2/1960 | Paine, Jr. . |
| 3,015,916 | 1/1962 | Denton . |
| 3,078,631 | 2/1963 | Seserman . |

(List continued on next page.)

OTHER PUBLICATIONS

Photocopy Rubber Band Technology Bandmaster 102 Model AF, no date.
Photocopy Rubber Band Technology Bandmaster 102 Model ET, no date.
Photocopy Strapack, Inc. Model Sivaron S–661M & 661Y, CPYR, 1984.
Photocopy Strapack Semiautomatic Strapping Mach.S–660, CPYR 1988.
Photocopy Uni–Pac Portable Strapping Kit, no date.
Photocopy Cyklop EM–15, 2 pages, CPYR 1987.
Photocopy, How To Strap Without Getting In A Bind;2 pages; no date.
Photocopy Cykop Strapping Corp., ASM Series, 2 pages, CPYR 1988.
Photocopy Strapack Semi–Automatic Strapping Machine Sivaron S–662.
Photocopy, Strapack Semi–Auto Strapping Machine Sivaron SS–40.
Photocopy Strapack Semi–Auto. Strapping Machines, Sivaron S–661, S–661L.
Photocopy Universal Strapping Semi–Automatic Plastic Strapping Mach.
Photocopy Universal Strapping Extruders Plastic Strapping, 8 pages.
Photocopy Malow Corp., Heavy Duty Tyer, 2 pages, no date.
SpeedCover, The Original Pre–Formed Pot Cover; Highland Supply '89.

Primary Examiner—Linda Johnson
Attorney, Agent, or Firm—Dunlap & Codding, P.C.

[57] ABSTRACT

A method and apparatus for securing a sheet of material about a flower pot for providing a decorative cover to the flower pot, using a band applicator with an object opening. The sheet of material is held in place on the flower pot and the flower pot with the sheet of material held there about is inserted into the object opening of the band applicator. The band applicator applies a band about the sheet of material and the flower pot whereby the sheet of material is secured to the flower pot via the band.

6 Claims, 1 Drawing Sheet

U.S. PATENT DOCUMENTS

| | | |
|---|---|---|
| 3,104,937 | 9/1963 | Wyckoff et al. . |
| 3,125,907 | 3/1964 | Derrickson . |
| 3,126,686 | 3/1964 | Kobylanski . |
| 3,129,728 | 4/1964 | Sharko . |
| 3,135,192 | 6/1964 | Derrickson . |
| 3,152,539 | 10/1964 | Sorensen . |
| 3,163,899 | 1/1965 | Karass . |
| 3,164,372 | 1/1965 | Derrickson . |
| 3,186,333 | 6/1965 | Hoffman et al. . |
| 3,189,060 | 6/1965 | Attas . |
| 3,192,584 | 7/1965 | Pape . |
| 3,204,312 | 9/1965 | Derrickson et al. . |
| 3,224,363 | 12/1965 | Talbot . |
| 3,251,295 | 5/1966 | Dickens . |
| 3,258,221 | 6/1966 | Derrickson et al. . |
| 3,263,599 | 8/1966 | Dickens . |
| 3,264,022 | 8/1966 | Talbot . |
| 3,279,354 | 10/1966 | Dickens . |
| 3,316,687 | 5/1967 | Bartlett, Jr. . |
| 3,318,230 | 5/1967 | Hilton . |
| 3,324,217 | 6/1967 | Armstrong et al. . |
| 3,368,323 | 2/1968 | Wood . |
| 3,393,633 | 7/1968 | Hoffman et al. . |
| 3,431,706 | 3/1969 | Stuck . |
| 3,531,910 | 10/1970 | Snead . |
| 3,545,723 | 12/1970 | Raley . |
| 3,554,846 | 1/1971 | Billett . |
| 3,612,480 | 10/1971 | Guy . |
| 3,612,481 | 10/1971 | Guy . |
| 3,636,861 | 1/1971 | Weller . |
| 3,639,530 | 2/1972 | Ryan . |
| 3,662,790 | 5/1972 | Styner . |
| 3,691,939 | 9/1972 | Goodley . |
| 3,709,758 | 1/1973 | Gilmore . |
| 3,750,239 | 8/1973 | Styner . |
| 3,759,169 | 9/1973 | Goodley . |
| 3,783,079 | 1/1974 | Wehr . |
| 3,799,835 | 3/1974 | Gilmore . |
| 3,826,443 | 7/1974 | Goodley . |
| 3,841,213 | 10/1974 | Goodley . |
| 3,847,071 | 11/1974 | Goodley . |
| 3,851,683 | 12/1974 | Glaus . |
| 3,873,387 | 3/1975 | Scheoning . |
| 3,896,525 | 7/1975 | Stewart, Jr. . |
| 3,949,662 | 4/1976 | Woomer . |
| 3,963,191 | 6/1976 | Goodley . |
| 3,974,762 | 8/1976 | Kita . |
| 3,984,278 | 10/1976 | Styner . |
| 3,995,409 | 12/1976 | Discavage et al. . |
| 4,005,647 | 2/1977 | Goodly . |
| 4,020,756 | 5/1977 | Weiss . |
| 4,020,879 | 5/1977 | Billett et al. . |
| 4,062,918 | 12/1977 | Nakanose . |
| 4,090,008 | 5/1978 | Haley . |
| 4,093,146 | 6/1978 | Haley . |
| 4,096,019 | 6/1978 | Lehmann . |
| 4,101,625 | 7/1978 | Haley . |
| 4,137,788 | 2/1979 | Fishcher . |
| 4,152,475 | 5/1979 | Haley . |
| 4,216,620 | 8/1980 | Weder et al. . |
| 4,220,493 | 9/1980 | Wehr . |
| 4,223,704 | 9/1980 | Glaus . |
| 4,227,949 | 10/1980 | Wehr . |
| 4,252,158 | 2/1981 | McDade . |
| 4,253,227 | 3/1981 | Bullington . |
| 4,254,703 | 3/1981 | Fulton et al. . |
| 4,297,811 | 11/1981 | Weder . |
| 4,300,312 | 11/1981 | Weder et al. . |
| 4,300,976 | 11/1981 | Wehr . |
| 4,328,742 | 5/1982 | Discavage . |
| 4,383,881 | 5/1983 | Sakaki . |
| 4,401,020 | 8/1983 | Brux . |
| 4,444,097 | 4/1984 | Wehr et al. . |
| 4,450,032 | 5/1984 | Wehr . |
| 4,454,808 | 6/1984 | Wehr et al. . |
| 4,470,241 | 9/1984 | Parry et al. . |
| 4,483,516 | 11/1984 | Wehr . |
| 4,502,911 | 3/1985 | Discavage . |
| 4,533,046 | 8/1985 | Kuhnert . |
| 4,536,248 | 8/1985 | Bullington et al. . |
| 4,554,779 | 11/1985 | Fischer . |
| 4,555,893 | 12/1985 | Nakata et al. . |
| 4,572,251 | 2/1986 | Drury . |
| 4,635,542 | 1/1987 | Sebelist et al. . |
| 4,711,071 | 12/1987 | Kagi . |
| 4,718,219 | 1/1988 | Schmitz . |
| 4,725,009 | 2/1988 | Fahrbach . |
| 4,733,521 | 3/1988 | Weder et al. . |
| 4,768,276 | 9/1988 | Harlow . |
| 4,773,182 | 9/1988 | Weder et al. . |
| 4,835,834 | 6/1989 | Weder . |
| 5,077,937 | 1/1992 | Weder et al. . |
| 5,085,003 | 2/1992 | Garcia . |
| 5,105,599 | 4/1992 | Weder . |
| 5,111,638 | 5/1992 | Weder . |
| 5,417,033 | 5/1995 | Weder ................................. 53/399 |

METHOD FOR SECURING A DECORATIVE COVER ABOUT A FLOWER POT

RELATED REFERENCES

This application is a continuation of U.S. Ser. No. 08/165,154, filed Dec. 10, 1993, entitled "MEANS FOR SECURING A DECORATIVE COVER ABOUT A FLOWER POT", now abandoned, which is a continuation of U.S. Ser. No. 07/979,389, filed Nov. 19, 1992, entitled "MEANS FOR SECURING A DECORATIVE COVER ABOUT A FLOWER POT", now abandoned, which is a continuation of U.S. Ser. No. 07/832,096, filed Feb. 6, 1992, entitled "MEANS FOR SECURING A DECORATIVE COVER ABOUT A FLOWER POT", now abandoned, which is a continuation-in-part of U.S. Ser. No. 07/765,416, filed Sep. 26, 1991, entitled "MEANS FOR SECURING A DECORATIVE COVER ABOUT A FLOWER POT", now U.S. Pat. No. 5,105,599 issued Apr. 21, 1992, which is a continuation of U.S. Ser. No. 07/530,491, filed May 29, 1990, entitled "MEANS FOR SECURING A DECORATIVE COVER ABOUT A FLOWER POT", now abandoned, which is a continuation of U.S. Ser. No. 07/315,169, filed Feb. 24, 1989, entitled "MEANS FOR SECURING A DECORATIVE COVER ABOUT A FLOWER POT", now abandoned.

FIELD OF THE INVENTION

The present invention relates generally to means for applying a sheet of material generally about the outer peripheral surface of a flower pot utilizing a band.

DESCRIPTION OF THE PREFERRED EMBODIMENTS

Figure 1:
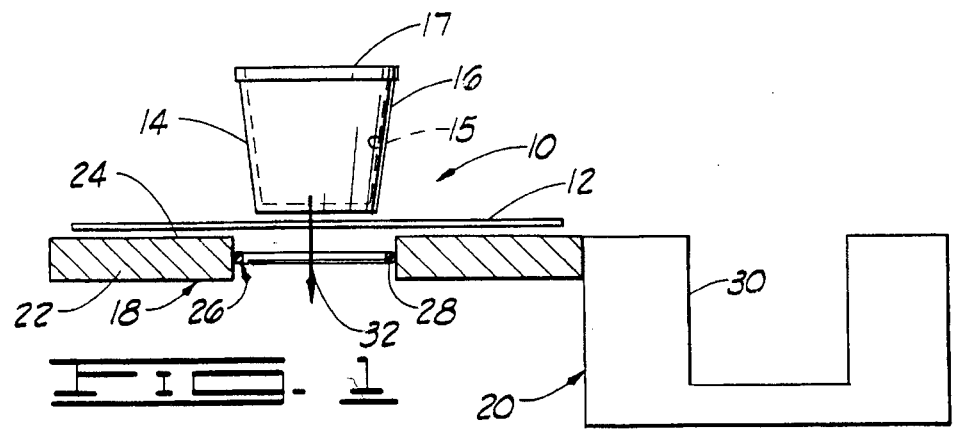
FIG. 1 is a sectional, diagrammatic view illustrating a flower pot generally positioned above a sheet of material and a cover forming device in position for forming the sheet of material about the outer peripheral surface of the flower pot and diagrammatically showing a band applicator for securing a band about the sheet of material after the sheet of material has been formed about the flower pot for securing the sheet of material in the formed position extending about the outer peripheral surface of the flower pot.
Figure 2:
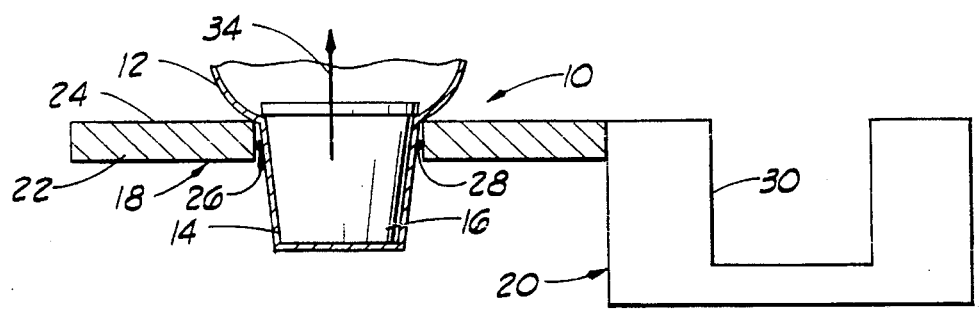
FIG. 2 is similar to FIG. 1, but shows the flower pot and the sheet of material moved into a position in the cover forming device wherein the sheet of material is formed about the outer peripheral surface of the flower pot.
Figure 3:
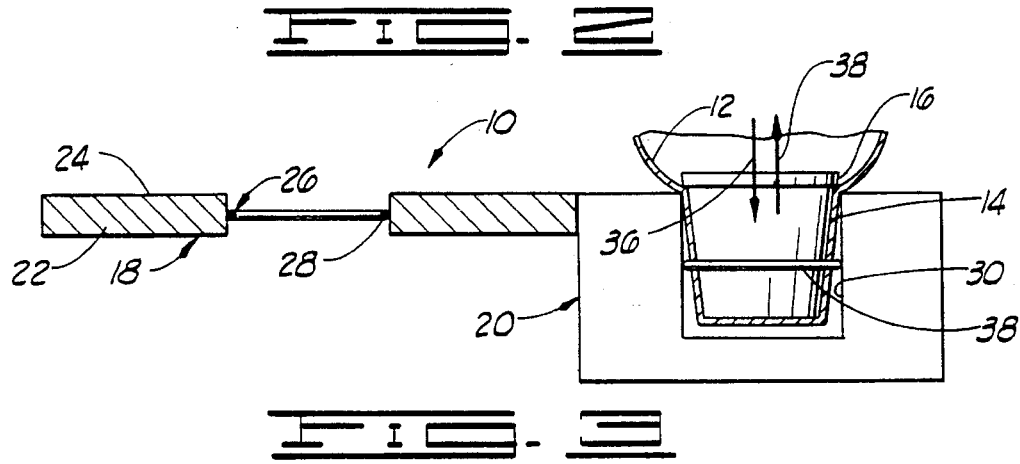
FIG. 3 is a view similar to FIG. 1, but showing the flower pot with the sheet of material formed thereabout removed from the cover forming device and disposed in the band applicator wherein a band is secured about the sheet of material for holding the sheet of material in position extending about the outer peripheral surface of the flower pot.

Shown in FIGS. 1, 2 and 3 and designated therein by the general reference numeral 10 is a system for securing a sheet of material 12 about an outer peripheral surface 14 of a flower pot 16 for the purpose of providing a decorative covering for the flower pot 16. The flower pot 16 has a flower pot opening 15 (FIG. 1) which extends through an upper end 17 (FIG. 1) of the flower pot 16 forming an open upper end 17. The system 10 includes a cover forming device 18 and a band applicator 20.

The cover forming device. 18 comprises a platform 22 having an upper support surface 24 and a flower pot opening 26 which is formed therethrough and intersects the support surface 24. A circularly shaped applicator 28 is supported on the platform 22 and the applicator 28 preferably is constructed of a foam-like material adapted to engage the material and the flower pot without damage the material or the flower pot, however, the applicator 28 is not necessary and the flower pot opening 26 may provide the sole means for forming the sheet of material 12 about the flower pot. 16. The opening through the applicator 28 forms the flower pot opening 26. A cover forming device which is constructed and operates like the covering forming device 18 is described in detail in U.S. Pat. No. 4,733,521 entitled, COVER FORMING APPARATUS, which is incorporated specifically herein by reference.

The sheet of material 12 may be a shape sustaining material such as a foil for example or a non-shape sustaining cellophane or processed organic polymer film material such as a processed organic polymer film like a polypropylene film for example. The term "processed organic polymer film" as used herein means a man-made resin such as a polypropylene as opposed to naturally occurring resins such as cellophane. A processed organic polymer film is relatively strong and not subject to tearing (substantially non-tearable), as might be the case with paper or foil. The processed organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications which is not the case with an untreated paper, for example, unless the paper is treated with a water resistant coating or impregnated with water a resistant material or laminated with such water resistant material. It also should be noted that some papers, such as long fiber papers, are substantially resistant to tearing (substantially nontearable when used as a placed in accordance with the present invention). In addition, a relatively thin film of a substantially linearly linked processed organic polymer does not substantially deteriorate in sunlight. Processed organic polymer films having carbon atoms, both linearly linked and cross linked, and some cross linked polymer films, also may be suitable for use in the present invention provided such films are substantially flexible, can be made in a sheet-like format for forming the sheet of material 12.

A decorative pattern, such as a solid color and/or an embossed pattern, and/or other decorative surface ornamentation may be applied to the inner surface and/or the outer surface of the sheet of material 12.

The sheet of material 12 may be constructed of a single sheet of material or a plurality of sheets of material. When constructed of a plurality of sheets of material, each sheet of material has a thickness in a range of from less than about 1.0 mil to about 2.5 mils. However, the upper limit on the thickness of each sheet of material could be as high as 20.0 mils depending on the type of material selected. Further, the resulting flower pot cover has a thickness in a range of from less than about 1.0 mils to about 2.5 mils which could be as high as 20.0 mils depending upon the number of sheets of material utilized and the type of materials selected.

The band applicator 20 includes an object opening 30 which is sized to receive a portion of the flower pot 16. The band applicator 30 is constructed and adapted to substantially automatically apply a band about an object placed within the object opening 30. The term "band" is used herein means any material which may be secured about an object such as the flower pot 16 such as bands commonly referred to as elastic bands or rubber bands and also includes any other type of material such as string or metal or rubber or plastic which may be secured about an object such as the flower pot 16. Band applicators which are constructed to operate like the band applicator 20 described herein are commercially available such as the band applicator available from Rubber Band Technology Limited of Yaykima, Washington and referred to or identified by their mark "BandMaster". Thus, a detail description is not deemed necessary herein.

The sheet of material 12 is disposed on the upper support surface 24 of the platform 22 to a position wherein the sheet of material extends over the flower pot opening 26 and is supported on the upper support surface 24 of the platform 22 in the position substantially as shown in FIG. 1. In this position of the sheet of material 12, the flower pot 16 is moved in the downward direction 32 (FIG. 1) to a position wherein the bottom of the flower pot 16 engages the sheet of material 12. The flower pot 16 then is further moved in the downward direction 32 engaging the sheet of material 12 and pushing the sheet of material 12 through the flower pot opening 26. As the sheet of material 12 and the flower pot 16 are moved in the downward direction 32 through the flower pot opening 26, the cover forming device 18 engages the sheet of material and forms the sheet of material about the outer peripheral surface of the flower pot while leaving the open upper end of the flower pot 16 open. The flower pot 16 and the sheet of material 12 are moved through the flower pot opening 26 to the position shown in FIG. 2 wherein the sheet of material 12 is formed about and extends about substantially the entire outer peripheral surface 16 of the flower pot 16 while leaving the opening upper end 17 of the flower pot 16 open.

After the sheet of material 12 has been formed about the flower pot 16, the flower pot 16 along with the sheet of material 12 formed thereabout is moved in the upwardly direction 34 (FIG. 2) to a position wherein the flower pot 16 with the sheet of material 12 formed thereabout is removed from the flower pot opening 26 of the cover forming device 18.

After the flower pot 16 with the sheet of material 12 formed thereabout has been removed from the cover forming device 18, the flower pot 16 along with the sheet of material 12 then is positioned over the object opening 30 of the band applicator 20. The flower pot 16 with the sheet of material formed thereabout then is moved in a downwardly direction 36 (FIG. 3) into the object opening 30 of the band applicator 20 to a position substantially as shown in FIG. 3. In this position, the band applicator 20 is actuated to cause a band 38 to be applied about the material and generally about the outer peripheral surface 14 of the flower pot 16.

The band 32 cooperates to secure the sheet of material 12 in position disposed about the outer peripheral surface 14 of the, flower pot 16. After the band 32 has been applied to the outer peripheral surface 14 and about the sheet of material 12, the flower pot 16 with the sheet of material 12 secured thereto by the band 32 is moved in the upward direction 38 (FIG. 3) for removing the flower pot 16 with the sheet of material 12 secured thereto by the band 32 from the band applicator 20.

It should be noted that the sheet of material 12 in one other embodiment is hand formed about the outer peripheral surface 14 of the flower pot 16 with the sheet of material 12 extending about the entire outer peripheral surface 14 of the flower pot 16, while leaving the open upper end of the flower pot open. After hand forming the sheet of material 12 about the outer peripheral surface 14 of the flower pot 16, the flower pot 16 with the sheet of material formed thereabout then is placed into the band applicator 20 and the band 38 applied thereto. In one other embodiment, the sheet of material 12 is formed about the flower pot 16 using the cover forming device 18 and then removed from the cover forming device 18 to a position where the band 38 is secured about the sheet of material 12 and about the flower pot 16.

EMBODIMENT OF FIG. 4

Figure 4:
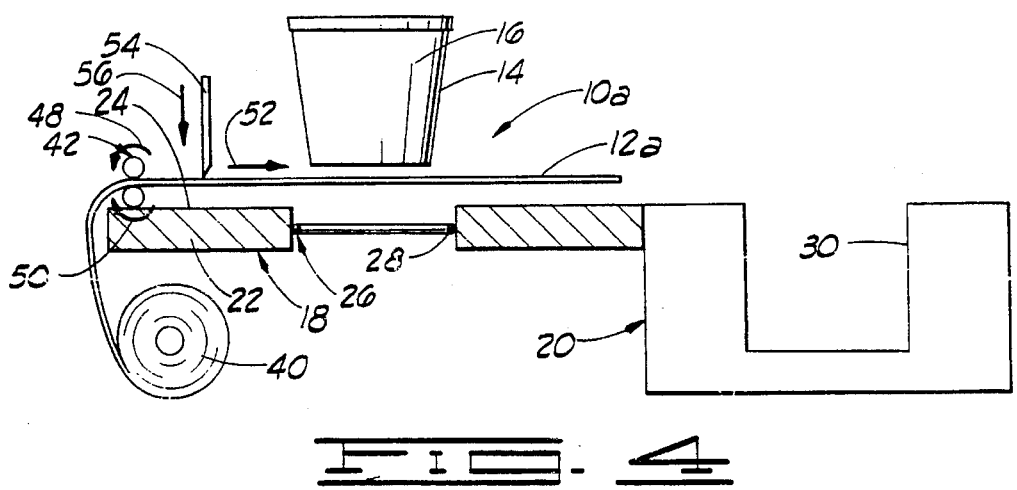
FIG. 4 is a schematic, diagrammatic view showing the system for automatically feeding the material to be applied about the flower pot to the cover forming device.

Shown in FIG. 4 is a modified system 10a for securing the sheet of material 12a about the flower pot 16 in a manner like that described before with respect to FIGS. 1, 2 and 3. The system 10a includes a roll of material 40 which is supported so that the material may be unrolled from the roll of material 40. The material in the roll of material 40 extends from the roll of material 40 through a pair of rollers 42 and over a portion of the upper surface 24 of the cover forming device 18.

At least one of the rollers 42 is powered. By rollingly actuating the rollers 42, the rollers 42 are rotated in the respective directions 48 and 50 as indicated in FIG. 3 to move the material in a general direction 52 to a position wherein a predetermined amount of the material has been disposed generally over the flower pot opening 26 in the cover forming device 18. After the predetermined amount of material has been unrolled from the roll of material 40 in a position generally over the flower pot opening 26, a knife 54 is actuated and moved in a downward direction 56 to a position wherein the knife 54 cuttingly engages the material thereby severing the sheet of material 12a from the roll of material 40. The knife is shown in FIG. 4 in a position just prior to cutting the sheet of material 12a from the roll of material 40.

After the sheet of material 12a has been cut by the knife 54, the sheet of material 12a is formed about the outer peripheral surface 14 of the flower pot 16 by moving the flower pot 16 through the cover forming device 18 in a manner like that described before. Further, the flower pot 16 with the sheet of material 12a formed thereabout then is placed into the band applicator 20 where the band 38 is applied about the sheet of material 12a and the flower pot 16 in a manner like that described before.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for securing a sheet of material about the outer peripheral surface of a pot means wherein the pot means includes a bottom and an opening extending through an upper end of the pot means, the method comprising:

providing the pot means;

providing the sheet of material;

providing a cover former having a pot means opening for forming the sheet of material into a decorative cover about the pot means;

providing a band applicator having an object opening and a band, the band applicator being spaced a distance from the cover former;

moving the sheet of material and the pot means into the pot means opening of the cover former to form the sheet of material into a decorative cover which substantially encompasses at least the outer peripheral surface and bottom of the pot means while leaving the upper end of the pot means uncovered;

removing the pot means having the decorative cover disposed about at least the outer peripheral surface and bottom of the pot means from the pot opening means in the cover former;

moving pot means having the decorative cover disposed about at least the outer peripheral surface and bottom of the pot means away from the cover former and into the object opening in the band applicator; and automatically removing the band from the band applicator and automatically positioning the band about the decorative cover for securing the decorative cover in position about the outer peripheral surface and bottom of the pot means such that the opening formed through the upper end of the pot means remains substantially uncovered by the decorative cover.

2. The method of claim 1 wherein the step of automatically placing the band about the decorative cover further comprises:

moving the pot means having the decorative cover disposed about at least the bottom and outer peripheral surface of the pot means into the object opening of the band applicator via the bottom of the pot means and then automatically positioning the band about the decorative cover for securing the decorative cover in position about the outer peripheral surface of the pot means while leaving the opening in the upper end of the pot means uncovered; and removing the pot means with the decorative cover secured thereto by the band from the object opening in the band applicator.

3. The method of claim 2 wherein the cover former comprises a platform having an upper support surface and the pot opening means extends therethrough and intersects the upper support surface of the platform, and wherein the step of moving the sheet of material and the pot means into the pot means opening of the cover former to form the sheet of material into a decorative cover comprises:

disposing the sheet of material upon the upper support surface of the platform of the cover former and over the pot means opening therein; and moving the pot means into engagement with the sheet of material via the bottom thereof and through the pot means opening in the platform of the cover former for forming the sheet of material into the decorative cover which extends about at least the outer peripheral surface and bottom of the pot means while leaving the upper end of the pot means uncovered.

4. The method of claim 3 wherein the step of providing the sheet of material further comprises:

unrolling material from a roll of material and moving a portion of the material onto the platform of the cover former such that a portion of the material extends over the pot means opening in the cover former; and cutting the material from the roll of material to form the sheet of material placed over the pot means opening in the cover former.

5. A method for forming and securing a decorative cover about the bottom and outer peripheral surface of a flower pot means wherein the flower pot means includes a flower pot opening extending through an upper end of the flower pot means, the method comprising:

providing the flower pot means;

providing a sheet of material sized to extend about at least the bottom and the outer peripheral surface of the flower pot means;

providing a cover forming device comprising a platform having an upper support surface and a flower pot means opening formed therethrough which intersects the upper support surface;

disposing the sheet of the material upon the upper support surface of the platform of the cover forming device and over the flower pot means opening therein;

moving the flower pot means into engagement with the sheet of material and through the flower pot means opening in the cover forming device for forming the sheet of material into a decorative cover which is disposed about at least the outer peripheral surface of the flower pot means while leaving the upper end of the flower pot means substantially uncovered by the decorative cover;

providing a band applicator having at least one band, the band applicator having an object opening therein adapted to receive a lower portion of the flower pot means, the band applicator being spaced a distance from the cover forming device;

removing the flower pot means having the decorative cover formed about at least the bottom and outer peripheral surface thereof from the flower pot means opening of the cover forming device;

moving the flower pot means having the decorative cover formed about at least the bottom and outer peripheral surface thereof to the band applicator;

positioning the flower pot means having the decorative cover disposed thereabout into the object opening of the band applicator via the bottom of the flower pot means;

automatically removing the band and automatically placing the band about the decorative cover for securing the decorative cover in position disposed about at least the bottom and outer peripheral surface of the flower pot means while leaving the upper end of the flower pot means uncovered; and removing the flower pot means having the decorative cover secured thereabout by the band from the object opening of the band applicator.

6. The method of claim 5 wherein the step of providing the sheet of material further comprises:

unrolling material from a roll of material and moving a portion of the material over the flower pot means opening in the cover forming device; and cutting the material from the roll of material to form the sheet of material placed over the flower pot means opening in the cover forming device.

* * * * *

UNITED STATES PATENT AND TRADEMARK OFFICE
CERTIFICATE OF CORRECTION

PATENT NO. : 5,617,702
DATED : April 8, 1997
INVENTOR(S) : Weder

Page 1 of 3

It is certified that error appears in the above-identified patent and that said Letters Patent is hereby corrected as shown below:

In the drawings, Figure 3, reference numeral "38" associated with the upwards direction should be changed to --34--.

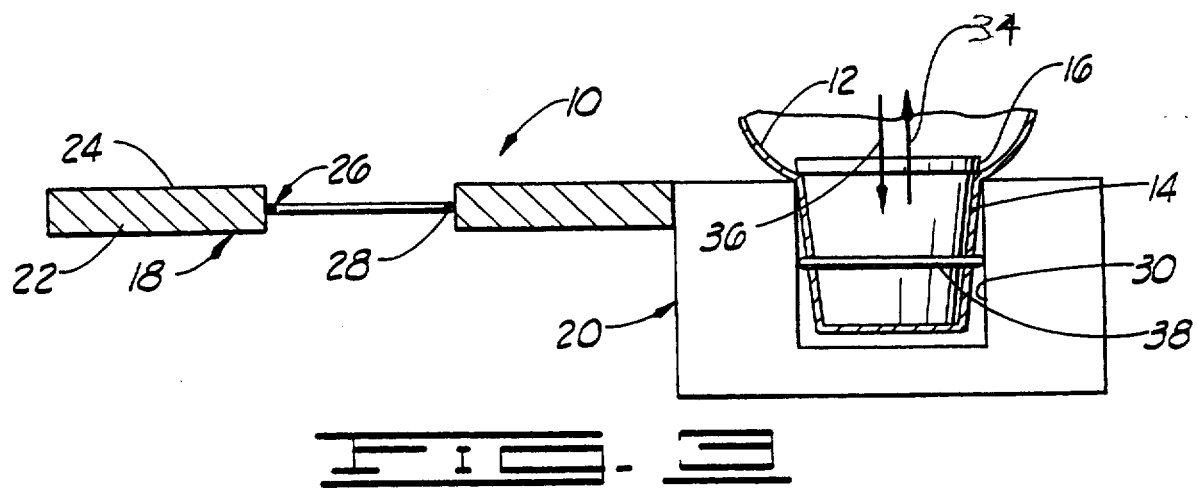

UNITED STATES PATENT AND TRADEMARK OFFICE
CERTIFICATE OF CORRECTION

PATENT NO. : 5,617,702
DATED : April 8, 1997
INVENTOR(S) : Weder

It is certified that error appears in the above-identified patent and that said Letters Patent is hereby corrected as shown below:

Column 2, line 3, please delete ".".

Column 3, line 1, please delete "30" and substitute therefor --20--.

Column 3, line 35, please delete "16" and substitute therefor --14--.

Column 3, line 57, please delete "32" and substitute therefor --38--.

Column 3, line 59, please delete "32" and substitute therefor --38--.

Column 3, line 62, please delete "32" and substitute therefor --38--.

Column 3, line 62, please delete "38" and substitute therefor --34--.

Column 3, line 64, please delete "32" and substitute therefor --38--.

UNITED STATES PATENT AND TRADEMARK OFFICE
CERTIFICATE OF CORRECTION

PATENT NO. : 5,617,702
DATED : April 8, 1997
INVENTOR(S) : Weder

It is certified that error appears in the above-indentified patent and that said Letters Patent is hereby corrected as shown below:

Column 5, line 9, please delete "moving pot" and substitute therefor-- moving the pot--.

Signed and Sealed this

Twenty-first Day of October 1997

Attest:

BRUCE LEHMAN

Attesting Officer    Commissioner of Patents and Trademarks